June 12, 1973 D. J. SOLTZ ET AL Re. 27,668
PH DETECTING DEVICE USING TEMPERATURE COMPENSATING FIELD-EFFECT TRANSISTOR DIFFERENTIAL AMPLIFIER
Original Filed March 16, 1966
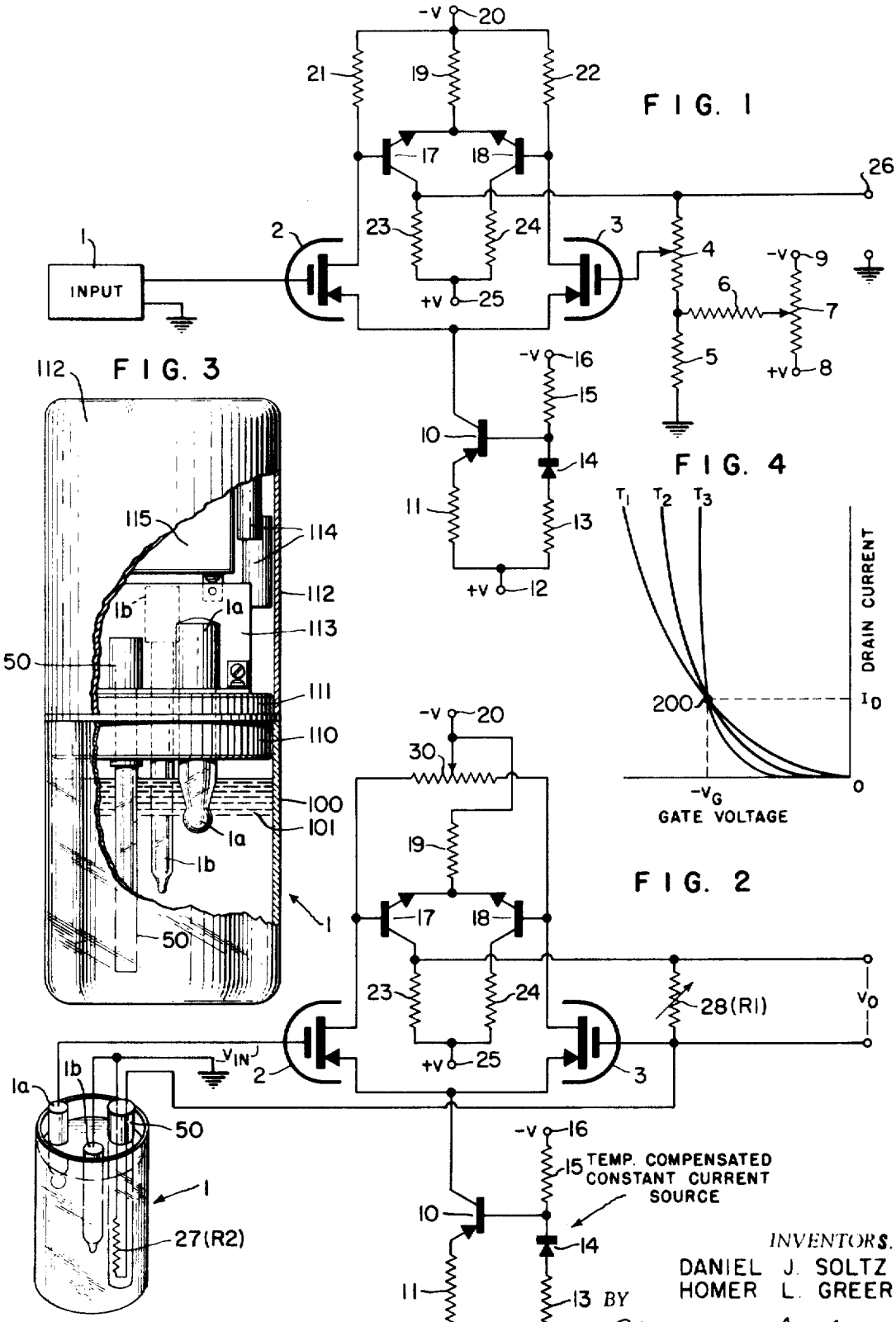
INVENTORS.
DANIEL J. SOLTZ
HOMER L. GREER
BY
J. Donald Weber, Jr.
ATTORNEY United States Patent Office Re. 27,668
Reissued June 12, 1973

27,668 pH DETECTING DEVICE USING TEMPERATURE COMPENSATING FIELD-EFFECT TRANSISTOR DIFFERENTIAL AMPLIFIER

Daniel J. Soltz, Norristown, and Homer L. Greer, Bryn Athyn, Pa., assignors to Honeywell Inc., Minneapolis, Minn.

Original No. 3,431,508, dated Mar. 4, 1969, Ser. No. 534,834, Mar. 16, 1966. Application for reissue Sept. 4, 1970, Ser. No. 69,763
Int. Cl. H03f *3/68*
U.S. Cl. 330—30 D 6 Claims

Matter enclosed in heavy brackets [ ] appears in the original patent but forms no part of this reissue specification; matter printed in italics indicates the additions made by reissue.

ABSTRACT OF THE DISCLOSURE

There is provided a solid state electronic pH detector.

This invention relates to a solid state amplifier circuit which may be utilized for measuring pH or hydrogen ion concentration in a solution. More particularly, the subject invention provides a system for automatically and continuously providing an electrical signal that is a function of the pH of the solution under test.

As is well known, pH is a symbol that refers to the concentration of hydrogen ions present in a liquid or solution. The relationship is a logarithmic one. That is, pH is approximately the negative logarithm (to the base 10) of the concentration of hydrogen ions per liter of solution. The hydrogen ion concentration of pure water, for example, is equal to $10^{-7}$ gram-equivalents per liter at twenty-two degrees centigrade. Consequently, pure water is assigned a pH value of 7 (the exponent) on the pH scale. The scale typically extends from zero for relatively strong acids to fourteen for relatively strong bases. This range, for all practical purposes, covers the useful area of investigation regarding pH.

While the concentration of hydrogen ions has significance because of its effect on certain chemical reactions, there are other important uses of the pH index. For example, the control of pH is a valuable method of controlling a large number of industrial processes, such as sugar refining, fermentation, petroleum processing, and the like. It is obvious, therefore, that a reliable method and apparatus for continuously providing an electrical signal, as a function of the pH of the solution or process under control, is of great importance.

It is generally conceded that the electrochemical method of pH measurement provides more accuracy than other methods. In this method, the potential developed between measuring and reference is indicative of the pH of the solution. Additionally, it is conceded that this method is more suitable for most industrial purposes than other methods. For example, the electrical output signal produced by apparatus using this method may be utilized to direct computer controlled processes or the like whereby direct control, either analog or digital, may be effected.

However, one problem which arises in the electrochemical sampling technique is in that the electrical amplifying device is detached from the electrodes of the sensing apparatus and separated therefrom by a relatively large, finite distance. This separation, especially in view of the high input impedance of the device, causes a severe problem insofar as input noise is concerned. To avoid this problem, it is desirable to place the electrodes and the amplifying system as close to one another as is possible. Consequently, the instant invention has been developed.

The subject invention relates to a differential-operation mode amplifier circuit which is utilized with an electrochemical sensing apparatus for detecting the pH of a solution. In the instant device, a transistorized or solid state circuit is utilized. For example, the input stage may comprise a pair of matched metal oxide semiconductor-field effect transistors (also known as insulated gate field effect transistors) thereby providing a large input impedance, for example on the order of $10^{14}$ ohms. The output stage of the amplifier may comprise a pair of matched NPN junction transistors such that the amplifier exhibits a relatively low output impedance, for example on the order of less than 5,000 ohms. Zeroing networks are connected to at least one of the amplifier stages in order to set the initial zero bias. That is, it is known that a small offset signal may be produced because of differences in the ambient temperature and/or the temperature in the solution. Additionally, a constant current source is provided to fix the proper operating conditions for the input stage. This constant current source, in a preferred embodiment, includes its own temperature compensation network. In addition, in one embodiment of the invention, a temperature compensating feedback network may be provided between the input and output networks. This temperature compensation feedback network is utilized to compensate for any variation in output signals which could be produced by a change in temperature of the solution which is under test.

These and other objects and advantages of the instant invention become more readily apparent with the reading of the following description in conjunction with the attached figures in which FIGURE 1 is a schematic diagram of one embodiment of the instant invention. FIGURE 2 is a further embodiment of the instant invention including a temperature compensating feedback network. FIGURE 3 is a diagrammatic showing of a typical pH detecting apparatus (and the associated electrodes) showing the instant circuit associated therewith. FIGURE 4 is an illustration of typical operating characteristics of a metal oxide semiconductor-field effect transistor.

Referring now to FIGURE 1, there is shown one embodiment of the instant invention. In this embodiment, an input signal is supplied by input device 1. Input device 1 may be any device for supplying a potential signal and may include the typical "measurement" and "reference" cell arrangement found in pH measuring apparatus. The input device is connected to the gate electrode of the metal oxide semiconductor field effect transistor 2. The metal oxide semiconductor field effect transistors are hereinafter referred to as MOS FET. The source or emitter electrode of MOS FET 2 is connected to the source or emitter electrode of a similar MOS FET 3. In fact, MOS FET's 2 and 3 may be a dual MOS fabricated on the same chip or substrate base. This type of fabrication is known, especially in integrated circuitry techniques. Furthermore, if the MOS FET's 2 and 3 are fabricated on the same chip, the problem of drift current and potential produced thereby which may be caused by differences in ambient temperature at the different elements is greatly reduced.

The gate or base electrode of MOS FET 3 is connected to the movable terminal of variable impedance 4. One terminal of impedance 4 is connected to the common junction of impedances 5 and 6. Another terminal of impedance 5 is connected to a reference potential, for example ground. Another terminal of impedance 6 is connected to the movable terminal of variable impedance 7. The other terminals of variable impedance 7 are connected to the positive and negative potential sources 8 and 9, respectively. These sources, as well as all other sources, may supply +12 volts or −12 volts, respectively, relative to the reference potential noted supra.

As noted supra, the emitter or source electrodes of the MOS FET's 2 and 3 are connected together. In addition, these electrodes are connected to the collector electrode of the PNP transistor 10. The emitter of transistor 10 is connected via impedance 11 to potential source 12 which is any typical source capable of supplying a substantially constant, relatively positive potential. Also connected to source 12 is one terminal of impedance 13. Another terminal of impedance 13 is connected to the anode of diode 14. The cathode of diode 14 is connected to the base electrode of transistor 11. Impedance 15 is connected between the base electrode of transistor 10 and the source 16 which may be any substantially constant potential source which supplies a relatively negative potential.

It is seen that, in addition to providing a potential dropping effect (for biasing), the PN junction of diode 14 provides a temperature compensation effect. That is, the PN junction of diode 14 is connected in parallel with the PN junction of transistor 10. Therefore, any ambient temperature effects on one junction will affect the other junction as well.

Connected between the collector or drain electrodes of MOS FET's 2 and 3 is the differential amplifier comprising NPN transistors 17 and 18. The base electrodes of the transistor 17 and 18 are connected to the drain electrodes of MOS FET's 2 and 3, respectively. The emitter electrodes of the transistors 17 and 18 are connected together. Impedance 19 is connected between the common emitter junction and source 20. Source 20 may be any suitable potential source capable of supplying a substantially constant, relatively negative potential. A load impedance 21 is connected between source 20 and the base of transistor 17 which is also connected to the drain of MOS FET 2. A similar impedance is connected between source 20 and the base electrode of transistor 18. Load impedances 23 and 24 are connected from the collector electrodes of transistors 17 and 18, respectively, to potential source 25. Source 25 is any suitable potential source capable of supplying a substantially constant, relatively positive potential. Since the circuit branch comprising transistor 18 and impedance 24 primarily provides balance to the circuit, these elements may be eliminated, if desirable.

Output terminal 26 is connected to the collector of transistor 17 and to a terminal of aforementioned impedance 4. The output signal at terminal 26 is measured relative to a suitable reference potential, for example ground.

Initially, the circuit can be zeroed. For example, especially in pH measurement, a pure water sample is supplied to the electrodes of input device 1. Typically, the signal supplied by input means 1, in the case of a pH measurement, will be on the order of zero to 0.5 volt (depending upon the type of electrodes). That is, the signal supplied by the "glass electrode" as related to the reference electrode is approximately one-half volt. Input means 1 applies this signal to the gate electrode of MOS FET 2.

While the reference signal is applied to the gate electrode of MOS FET 2 by input device 1, another signal is applied to the base electrode of MOS FET 3 via the wiper arm of impedance 4. This latter signal is controlled by the setting of the wiper arms on impedances 4 and 7. That is, impedance 7 (a variable resistor for example) is connected between sources 8 and 9 which produce potentials large enough to offset any circuit unbalance. This circuit branch provides the adjustment for the zeroing arrangement. Impedances 4 and 5 form a negative feedback network to stabilize the amplifier. The variation of impedance 4 provides the gain adjustment for the amplifier. The output signal produced by this balanced condition is used to signify a solution having a pH of seven or other selected reference value. Thus, when the aforesaid electrodes of input device 1 are immersed in an unknown solution under test, the variation in the signal produced thereby is detected by MOS FET 2 relative to the signal supplied to MOS FET 3. The signal produced by the circuit, at output terminal 26, is then indicative of the pH of the test solution.

The constant current source comprising transistor 10 and the associated elements, provides the current to the MOS FET's 2 and 3. It should be noted, that this constant current generator is also temperature compensated through the use of the diode 14 as noted supra. That is, if the ambient temperature changes, it is conceivable that the PN junction of transitor 10 could vary whereby the operating characteristics thereof are altered. By inserting the PN diode junction 14 in parallel therewith, the ambient temperature effects are compensated. Therefore, the current supplied by the current generator comprising transistor 10 remains substantially constant. It is desirable to utilize a constant current source such that the signal supplied by input device 1 is the control signal. Additionally, the constant current source fixes the proper operating conditions for the input stage.

The current produced by the constant current source is determined in accordance with the MOST FET operating characteristics shown in FIGURE 4. More particularly, MOS FET's exhibit slightly different gate voltage $V_G$ versus drain current $I_D$ characteristic curves for different temperatures. Thus, the curves $T_1$, $T_2$ and $T_3$ are somewhat different. However, in most MOST FET's a temperature stable point 200 is observable. This point is characterized by a relatively fixed gate voltage and current drain. Therefore, in order to avoid temperature compensation problems at the MOST FET, the proper drain current is supplied by the constant current source. Since MOS FET's 2 and 3 are driven by the constant current source, transistor 10 supplies about $2I_D$. The current provided by transistor 10 (1.0 milliampere for example) is determined by properly choosing the values of resistors 11, 13 and 15 as well as the values of sources 12 and 16. By regulating the constant current source to provide the "temperature-stable-drain-current," the requirement of temperature ovens or the like is avoided.

Thus, after initializing, the circuit is prepared for operation. In operation, the circuit detects changes produced by the input device. With the change of the signal at the gate or base electrode of MOS FET 2, the conduction thereof changes. For example, if the pH of the solution produces a signal greater than the reference signal used for zeroing, MOST FET 2 will conduct more current therethrough. Of course, a smaller signal at the gate electrode of MOST FET produces less current therethrough. Consequently, the current and potential supplied at the base of transistor 17 are also altered. That is, the current through the series circuit branch comprising MOS FET 2 and impedance 21 is altered whereby, the potential difference between the base and emitter electrode of transistor 17 is altered. The conduction of transistor 17 at the collector-emitter junction is thereby altered such that the potential drop across impedance 23 changes. For example, as more current flows through the aforesaid series circuit branch, the potential drop across impedance 21 increases. Therefore, the potential at the base of transistor 17 become relatively more positive. A more positive signal at the base of an NPN transistor produces increased current flow therethrough. This increased current flow also exists in impedance 23 whereby a greater potential drop is detected thereacross. This change in potential drop across impedance 23 is detected at output terminal 26.

The output signal detected at output terminal 26 is a function of the potential which is dropped across the load resistor 23. Therefore, as the operation of MOS FET 2 varies in response to the application of a changed input signal, the operation of transistor 17 similarly is altered. As the current conduction through transistor 17 and impedance 23 varies, the potential dropped across impedance 23 varies. Consequently, the output signal detected at terminal 26 is altered in response thereto. By detecting this signal at the output terminal 26, the pH of the solution under test, for example, may be determined.

Thus, it is seen that an amplifier circuit incorporating the extremely high input impedance (for example on the order of $10^{14}$ ohms) of an MOS FET element and providing relatively low output impedance (for example less than 5,000 ohms) is described. In addition, temperature compensation for ambient temperatures is also provided. These advantages provide for more accurate and more reliable operation of the instant circuit when used as an amplifier, for example in pH measuring apparatus.

Referring now to FIGURE 2, there is shown another embodiment of the instant invention wherein similar techniques are utilized. In FIGURE 2, components which are similar to those shown in FIGURE 1 bear similar reference numerals. In FIGURE 2, input device 1 is shown in more detail as including the typical electrodes found in a pH measuring apparatus. For example, the glass electrode 1a is shown connected to the base or gate electrode of MOS FET 2. The Calomel or reference electrode 1b is exemplified as providing a reference against which the output from the glass electrode is compared. It should be noted that a beaker-like container is illustrated. However, the instant invention will operate in other applications, for example a conduit or the like in a system under control.

In addition, there is shown electrode 50 which includes a temperature sensitive impedance 27. Such temperature sensitive impedances are known in the art. Temperature sensitive impedance 27 is so chosen that its variation is proportional to and of the proper sense to offset the change in pH of the solution as indicated by the electrodes due to change in temperature thereof. Each of these electrodes is inserted into the sample solution which is being investigated. It is noted that one terminal of the temperature sensitive impedance 27 is connected to reference electrode 1b. This junction is also connected to a suitable reference potential, for example, ground. Another terminal of impedance 27 is connected to the base or gate electrode of MOS FET 3. The feedback impedance 28 is connected from the base or gate electrode of MOS FET 3 to the collector of transistor 17 which is connected to output terminal 26. Impedance 28, which is also designated as R1, is shown as a variable impedance. This impedance need not be variable; however, a variable impedance at this location provides for selectively variable gain adjustment.

In the embodiment shown in FIGURE 2, the biasing network of FIGURE 1 comprising, inter alia, impedances 21 and 22 is eliminated. Instead, the zeroing network is replaced by a single variable impedance 30. The movable tap of impedance 30 is connected via impedance 19 to the common connection of the emitter electrodes of transistors 17 and 18. This arrangement provides for the initial zeroing of the circuit. Thus, when a reference solution (e.g., pure water) is initially utilized, the movable tap of impedance 30 is moved (as may be necessary) until the parallel circuit branches are balanced.

The operation of the circuit configuration shown in FIGURE 2 is substantially similar to the operation of the circuit shown in FIGURE 1. Thus, a change at the gate electrode of MOS FET 2 in response to a signal produced by the pH of a solution under test alters the current in that circuit branch. Ultimately, the signal developed across impedance 23 is also altered. In addition, the inclusion of the temperature sensitive impedance 27, which is directly immersed in the solution, compensates for temperature variations in the solution. Thus, more accurate and reliable operation is afforded. That is, it is known that the characteristics of the pH electrodes in a solution vary as a function of the temperature of the solution. By varying the amplifier operation as a function of temperature change, this variation in pH electrodes is compensated.

More particularly, in the operation of the circuit, if the amplification is relatively high, the overall amplification is (within a reasonable assumption) essentially a function of the feedback resistors $R_1$ and $R_2$. That is, the amplification may be expressed as:

$$A=R_1/R_2$$

Typically, A may have a value of 200 to 300, but is not limited thereto. From the foregoing, the output signal may be designated as:

$$V_o=V_{in}\times R_1/R_2$$

Therefore, if $R_2$ is a properly selected temperature dependent resistor or similar impedance, variations in the temperature of the solution will be detected thereby, inherently included in the circuit operation and the overall operation of the circuit will be altered as required.

A review of the expression for the output signal shows that variable gain is easily obtained by varying the impedance of elements $R_1$ or $R_2$. However, $R_2$ (impedance 27) is not readily adjustable for selective control by the operator. Therefore, variable impedance 28 ($R_1$) is provided to permit easily adjustable gain selection for the network.

Referring now to FIGURE 3, there is shown a diagrammatic representation of the instant circuit utilized as a unitary and integrally packaged pH measurement amplifier. In this diagrammatic representation, the package for the instrument is partially broken away for convenience. Thus, the input device 1 is shown comprising a wall 100 of the vessel containing the solution 101 which is being investigated. The wall 100 may be a beaker, a vat, a pipeline or the like. The electrodes 1a, 1b and 50 are immersed in the solution or fluid 101. Each of the aforesaid electrodes extends through the cap 110 and the base 111. The cap 110 is a fitting which may be inserted into the vessel 100 to assure a tight seal as may be necessary in some applications. The base 111 is the support member for the internal packaging of the device. The base 111 may be attached to the housing 112 by any suitable fabrication method, for example a force fit or by set screws or the like. A mounting element 113 is connected to the base 111 by means of screws and brackets, for example. The mounting element 113, which may be fabricated of a sheet of Bakelite for example, may be utilized both as a means for mounting circuit components as well as a spacer element for holding the package or "can" 115 away from the electrode ends.

Thus, the circuitry shown in FIGURES 1 and 2 may be encapsulated in a suitable can 115 and mounted within the housing 112 as suggested in FIGURE 3. The elements 114 are inserted to suggest that certain bulky elements may be disposed within the housing 112 but external to the can 115, if desirable. The specific type of component and the connections thereof are not shown in FIGURE 3.

In accordance with the suggested structure shown in FIGURE 3, a prepackaged unit including an external housing 112 closed by a base 111 and including the amplifier circuitry (see FIGURES 1 and 2) housed within the can or internal housing 115. This package, including the electrodes which extend through base 111 forms the basic unit. A sealing member 110, for example cork or the like, may be included if desirable. In a typical design, the package, exclusive of electrodes, was constructed in a cylindrical configuration having a diameter of approximately three inches and a height of approximately four inches.

Thus, it is seen that there is provided, by this invention, an amplifier having high input impedance and low output impedance with relatively high amplification. Through the various compensation means, circuit alignment and drift is reduced. Because of this configuration, the necessity for an A.C. amplifier which requires a chopper or the like is eliminated. Therefore, and because of the solid state components which are utilized, the physical dimensions of the device are small. Consequently, the advantages of this invention become readily apparent.

It is to be understood, of course, that this description is a preferred embodiment only. Various modifications and changes can be made to this embodiment. For example, PNP transistors may be utilized instead of NPN transistors; polarities may be changed; and the like. Such modifications, which fall within the purview of this description, are intended to be included herein.

What is claimed is:

[1. An amplifier circuit comprising, first amplifier means characterized by extremely high input impedance, second amplifier means characterized by relatively low output impedance, input means connected to a first input terminal of said first amplifier means, control means connected to a second input terminal of said first amplifier means, said first amplifier means connected in a differential mode whereby the operation thereof is indicative of the relationship between the signals supplied by said input means and said control means, said first amplifier means further characterized by a predetermined temperature-stable operating point determined by the current and voltage applied thereto, said second amplifier means connected to said first amplifier means such that the operation thereof is indicative of the operation of said first amplifier means, said second amplifier means connected in a differential mode to form a symmetrical load for said first amplifier means, and output means connected to said second amplifier means to be controlled thereby.]

[2. The amplifier circuit recited in claim 1 wherein said first differential operating mode amplifier means comprises a pair of metal oxide semiconductor field effect transistors, said second amplifier means comprises a pair of balanced semiconductor devices connected across the outputs of said first amplifier means.]

[3. The amplifier circuit recited in claim 1 including constant current generating means connected only to said first amplifier means, said constant current generating means including temperature compensating means to reduce the deleterious effects of variable ambient temperature on the constant current generated by said constant current generating means, said constant current generating means including control means for regulating the current generated thereby to fix the operating conditions for said first amplifier means at a temperature stable value.]

[4. The amplifier circuit recited in claim 1 including adjustable bias means associated with said first amplifier means, and wherein said control means includes adjustment means such that the gain of said amplifier circuit is selectively variable.]

[5. The amplifier circuit recited in claim 1 including electrodes connected to the input of said first amplifier means, said electrodes being adapted to be inserted into a solution to be investigated, said electrodes characterized by producing a potential difference therebetween which is a functional of a physical characteristic of said solution.]

[6. The amplifier circuit recited in claim 5 including feedback means connected to said output means, said feedback means comprising a temperature sensitive device adopted for insertion into said solution being investigated to thereby detect a change in temperature of said solution, said feedback means operative to effect said output means as a function of the change in temperature of said solution whereby the output change produced by said temperature change is compensated for.]

*7. An amplifier system for measuring a physical characteristic of a solution comprising*

*an electrode structure adapted to be inserted into a solution to be investigated, said electrode structure being characterized by a response to a physical characteristic of the solution to produce a potential representative of said physical characteristics across an extremely high output impedance,*

*a first amplifier means, having an input circuit characterized by an extremely high input impedance and a relatively low output circuit impedance, said first amplifier means having said input circuit connected to said extremely high output impedance of said electrode structure and being immediately adjacent to said electrode structure to minimize pickup of electrical noise in said input circuit,*

*stabilizing means connected to said first amplifier means to establish the operating state of said first amplifier means at a temperature-stable value,*

*control means to produce a control signal indicative of a predetermined level of said physical characteristic,*

*a second amplifier means connected to receive an output signal from said first amplifier means and having a connection to receive said control signal from said control means, said second amplifier means having a relatively low input impedance matching the relatively low output impedance of said first amplifier means and including a difference amplifier arranged to produce an output signal representing the difference between the output signal from said first amplifier means and said control signal, and*

*output signal terminal means for said second amplifier means.*

*8. An amplifier system as set forth in claim 7 and including a temperature compensating means associated with said solution and being connected to said second amplifying means, the temperature compensating means being operative to modify an output signal from said second amplifying means as a function of a change in temperature of said solution whereby to compensate the output signal from said second amplifying means upon change in the temperature of said solution.*

*9. An amplifier system as set forth in claim 7 wherein said electrode structure includes a pH sensitive electrode responsive to the hydrogen ion activity of the solution.*

*10. An amplifier system as set forth in claim 7 wherein said first amplifier means includes a pair of field-effect transistors connected as a difference amplifier to amplify the potential from said electrode structure and said control signal.*

*11. An amplifier system as set forth in claim 8 wherein said amplifier means includes a pair of field-effect transistors connected as a difference amplifier to amplify the difference between the potential from said electrode structure and said control signal.*

*12. An amplifier system as set forth in claim 9 wherein said first amplifier means includes a pair of field-effect transistors connected as a difference amplifier to amplify the difference between the potential from said electrode structure and said control signal.*

(References on following page)

References Cited

The following references, cited by the Examiner, are of record in the patented file of this patent or the original patent.

UNITED STATES PATENTS

| | | | |
|---|---|---|---|
| 2,604,382 | 7/1952 | Woodruff | 324—30 R |
| 2,731,519 | 1/1956 | Bordewieck | 330—69 X |
| 2,930,982 | 3/1960 | Patterson | 328—158 |
| 3,140,408 | 7/1964 | May | 330—35 V X |
| 3,309,528 | 3/1967 | Ashley et al. | 330—30 D X |
| 3,370,242 | 2/1968 | Offner | 330—30 D X |
| 3,197,755 | 7/1965 | Conger | 340—30 D X |
| 2,676,286 | 4/1954 | Buchner | 317—149 |

| | | | |
|---|---|---|---|
| 3,161,045 | 12/1964 | Ames | 73—88.5 |
| 3,178,651 | 4/1965 | Kegelman | 330—69 |
| 3,317,850 | 5/1967 | Hilliber | 330—23 |

OTHER REFERENCES

Electronics, June 14, 1963, pp. 56, 58, Components and Materials, "French Reveal New Field Effect Structure," by A. V. J. Martin.

NATHAN KAUFMAN, Primary Examiner

U.S. Cl. X.R.

330—35, 69; 324—30 R